United States Patent [19]
Deboaisne et al.

[11] Patent Number: 5,565,624
[45] Date of Patent: Oct. 15, 1996

[54] METHOD OF DETERMINING VARIATIONS IN THE MORPHOLOGY OF A BOREHOLE

[75] Inventors: Renaud Deboaisne, Bedeille; Pascal Bauer, Lembeye, both of France

[73] Assignee: Elf Aquitaine Production, France

[21] Appl. No.: 495,671

[22] PCT Filed: Jan. 24, 1994

[86] PCT No.: PCT/FR94/00083

§ 371 Date: Jul. 26, 1995

§ 102(e) Date: Jul. 26, 1995

[87] PCT Pub. No.: WO94/17281

PCT Pub. Date: Aug. 4, 1994

[30] Foreign Application Priority Data

Jan. 27, 1993 [FR] France ................. 93 00787

[51] Int. Cl.⁶ .................................................. E21B 47/08
[52] U.S. Cl. ............................ 73/152.02; 33/543; 33/544; 364/422; 73/152.17
[58] Field of Search ................ 73/151, 150; 33/302, 33/304, 313, 331, 542, 543, 544, 544.5, 558.01, 558.2; 364/422

[56] References Cited

U.S. PATENT DOCUMENTS 3,724,589  4/1973  Chapman, III .................. 181/5 B1
5,426,368  6/1995  Benimeli et al. ................ 324/366

FOREIGN PATENT DOCUMENTS 0112248  6/1984  European Pat. Off. .
0110750  6/1984  European Pat. Off. .
0363529  4/1990  European Pat. Off. .
0502727  9/1992  European Pat. Off. .

Primary Examiner—Michael Brock
Attorney, Agent, or Firm—Ostrolenk, Faber, Gerb & Soffen, LLP

[57] ABSTRACT

Method of determining variations in the morphology of a borehole. It consists in measuring, as a function of the depth of the borehole, the dip and the azimuth ($a_1$) of the borehole, the inside diameters of the borehole in two perpendicular directions, and the azimuth ($a_2$) of a reference caliper and it is characterized in that consists in determining the eccentricity ($e_m$), together with an eccentricity error ($\Delta e_m$), the azimuth ($a_3$) of the second caliper from the azimuth ($a_2$), and the rotation speed ($V_R$) of the reference caliper, and then comparing ($\Delta e_m$) to a threshold value ($\Delta e_s$) and ($V_R$) to a threshold value ($V_S$) to determine the type of ovalization of the borehole.

13 Claims, 3 Drawing Sheets

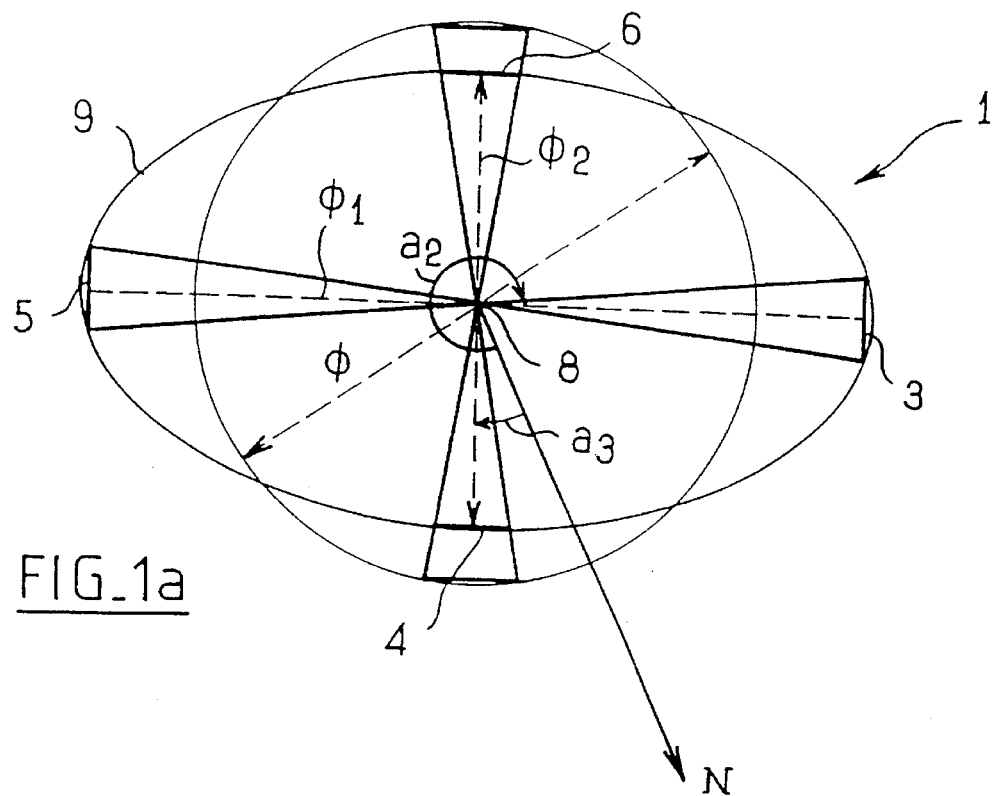
FIG_1a
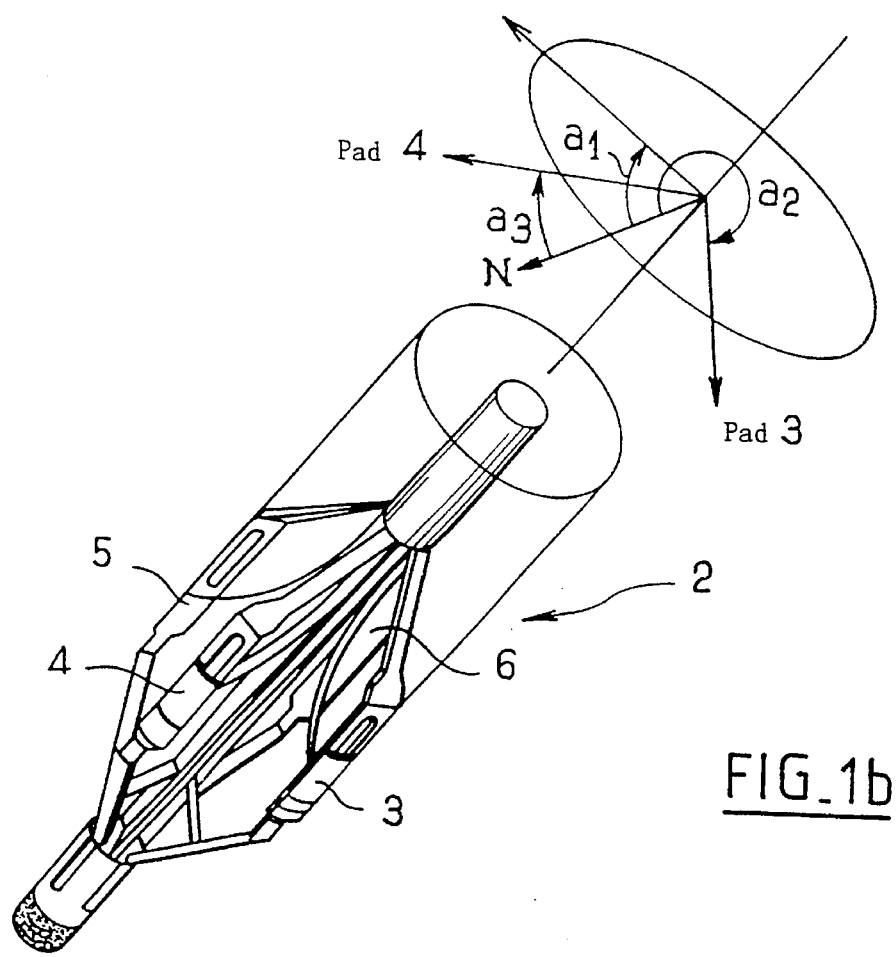
FIG_1b

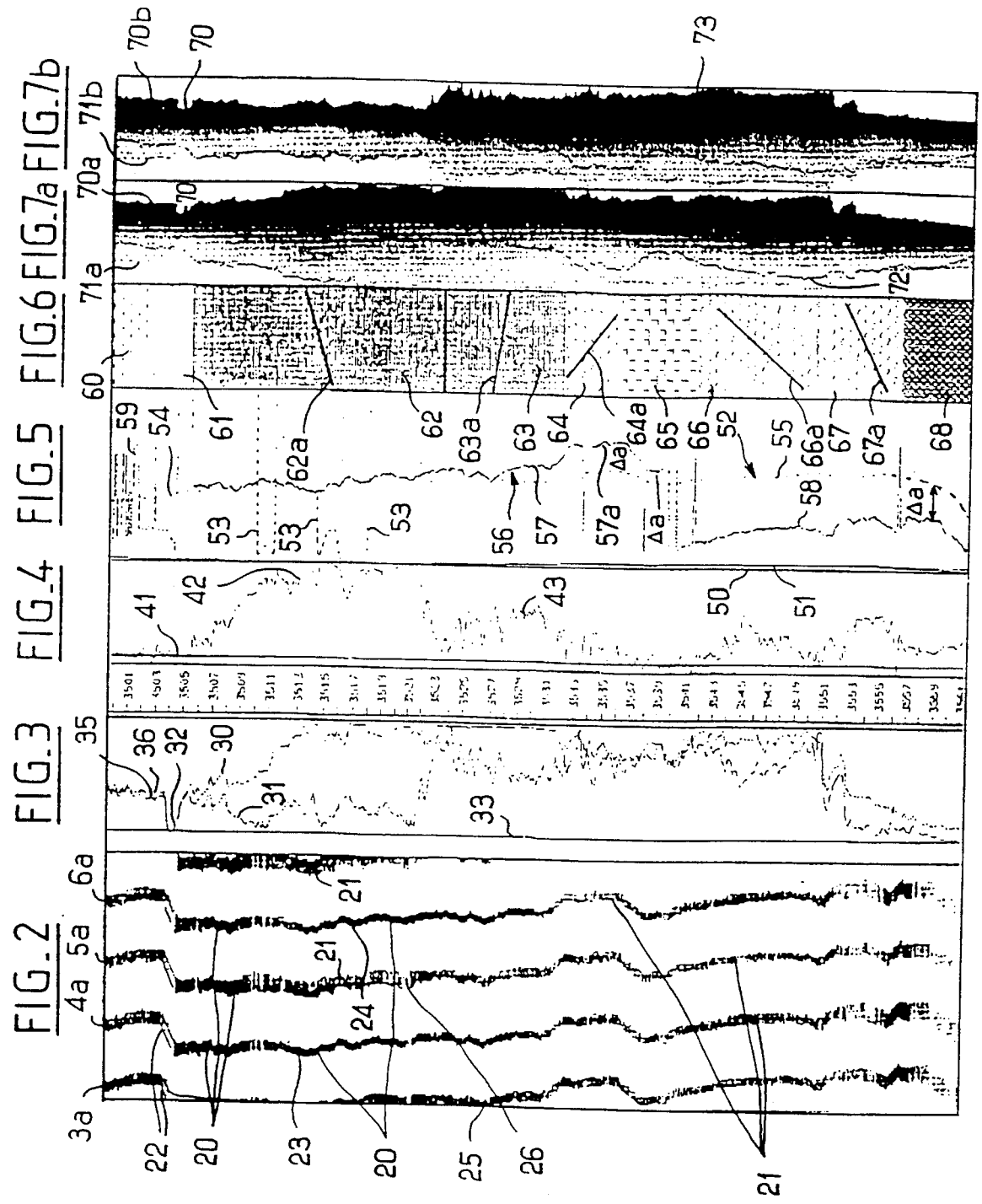

METHOD OF DETERMINING VARIATIONS IN THE MORPHOLOGY OF A BOREHOLE

This is a 371 of PCT/FR 94/00083 filed Jan. 24, 1994.

BACKGROUND OF THE INVENTION

The present invention concerns a method of determining variations in the morphology of a borehole.

Electrical imaging of the borehole wall is increasingly being used to determine the shape and the dimensions of said borehole. Electrical images of the borehole wall are obtained by means of special-purpose tools known as dipmeters including the FORMATION MICRO SCANNER (FMS) developed by SCHLUMBERGER.

A dipmeter such as the FMS has at its lower end means for emitting a focused electric current and pads which bear against the borehole wall. The electrical resistivities of said wall are measured using electrodes on each of said pads. The number of electrodes on each pad can vary from one tool to another, in order to obtain better coverage of the borehole wall.

The FMS or equivalent measurement tool is designed to operate in conductive water-based mud, the scanning depth varying from 2.5 cm (1 inch) to 15 cm (6 inches).

The tool has at its upper end at least one three-axis accelerometer and three magnetometers for measuring the speed, the position and the orientation of the tool in each measurement period.

The logged measurements obtained using the tool can be processed, for example to correct the speed and in particular to correct irregular movement of the tool due to the tool jamming in the borehole, and to correct the current since the current emitted varies to maintain the optimal resolution in the event of high contrast in the resistivity.

Further processing can also be applied, such as horizontal normalization of the measurements and representation of the resistivity images relative to a given azimuth direction, usually North.

The measurement tool described in outline above is used, among other things, to determine the direction of maximum stress that can deform the wall of the borehole. The generic term for this is "ovalization".

Due to in situ stresses of tectonic origin, the wall of a borehole tends to scale in a preferred direction, creating eccentric voids of greater or lesser depth with their major axis perpendicular to the direction of the maximum horizontal stress. This phenomenon is known as "ovalization by scaling".

If the direction of the maximum horizontal stress is known, the directions in which cracked reservoirs drain are known more accurately, it is possible to predict the directions in which hydraulic fractures develop, and some wall strength problems can be understood and solved.

Accordingly, attempts have been made to develop ovalization as a means of detecting, orienting and quantifying deformation of the wall of a borehole, and above all to discriminate between the various types of ovalization to determine that which can indicate the orientation of the maximum horizontal stress, since there are several types of ovalization that are related to other types of deformation, of greater or lesser apparent similarity, but of different origins. These include wear ovalization due to rubbing of the string of drill pipes against the wall of the borehole, ovalization due to the presence of structural discontinuities such as stratification, fracturing, etc.

Unfortunately, existing techniques are not able to discriminate or to distinguish quickly and reliably the type of ovalization which can indicate the orientation of the maximum horizontal stress.

SUMMARY OF THE PRESENT INVENTION

Starting with the resistivity measurements obtained by means of the tool, it is necessary to make an empirical definition of the type of ovalization and then to determine if the latter ovalization matches preliminary studies carried out by other means. If there is insufficient correspondence, then a different type of ovalization is defined and this process is repeated until the appropriate ovalization is determined.

An object of the present invention is to propose a method of determining variations in the morphology of a borehole which determines the various types of ovalization sequentially and, after viewing of the results on a medium, determines the type of ovalization which indicates the appropriate orientation of the maximum horizontal stress.

The present invention comprises a method of the type using a tool comprising at least two calipers and measurement units and continuously measuring by means of said tool and as a function of the depth the dip and the azimuth ($a_1$) of the borehole in a geographical system of axes;

the inside diameters of the borehole in two perpendicular directions, by means of the two calipers, one of the inside diameters being representative of the greatest horizontal deformation of the borehole;

the azimuth ($a_2$) of a first caliper taken as a reference diameter in the system of axes of the borehole;

and further comprises:

continuously determining the eccentricity ($e_m$) of the borehole which is representative of the ratio of the diameters of the borehole and of the eccentricity error $\Delta e_m$ which is equal to $1-e_m$, determining the azimuth ($a_3$) of the second caliper from the azimuth ($a_2$) of the reference first caliper in the system of axes of the borehole, determining the variation in the azimuth ($a_2$) of the reference first caliper during displacement of the tool in the borehole in order to determine the rotation speed ($V_R$) of said reference caliper during said displacement, comparing said eccentricity error ($\Delta e_m$) to a threshold value ($\Delta e_s$) to define the presence of ovalization of the borehole when ($\Delta e_m$) is greater than ($\Delta e_s$) and then specifying the type of ovalization by comparing the rotation speed ($V_R$) to a threshold value ($V_s$).

BRIEF DESCRIPTION OF THE DRAWINGS

Other advantages and features of the invention will emerge more clearly from a reading of the following description of one preferred embodiment of the invention and from the appended drawings in which:

FIG. 1a shows the ovalization of a borehole in an anisotropic stress field.

FIG. 1b is a perspective view of the lower part of the tool including four pads.

FIG. 2 is a graphical representation initially cylindrical now flattened out (unwound), showing the information logged from each pad, with the dark areas representing area of high conductivity.

FIG. 3 is a graphical representation showing three curves representing the nominal diameter of the borehole and diameters measured by the tool in two perpendicular directions, as a function of depth.

FIG. 4 is a graphical representation showing the eccentricity determined from the values of the two borehole diameters measured by the tool from FIG. 1b, as a function of depth.

FIG. 5 is a graphical representation four curves which represent, as a function of depth, the deviation of the borehole from the vertical (in full line), the direction of the deviation of the borehole, which is between 0° and 180° relative to North (in dashed line), the direction of the ovalization when it is below a predetermined threshold (in dotted line) and the direction of the ovalization when it is above the predetermined threshold (thick dotted line).

FIG. 6 is a graphical representation showing a breakdown of the ovalization areas in accordance with a representation code.

FIGS. 7a and 7b are two graphical image logs of the borehole, as a function of depth, in two perpendicular directions and showing the traces of the two pads.

DETAILED DESCRIPTION OF EMBODIMENTS OF THE INVENTION

Figure 8:
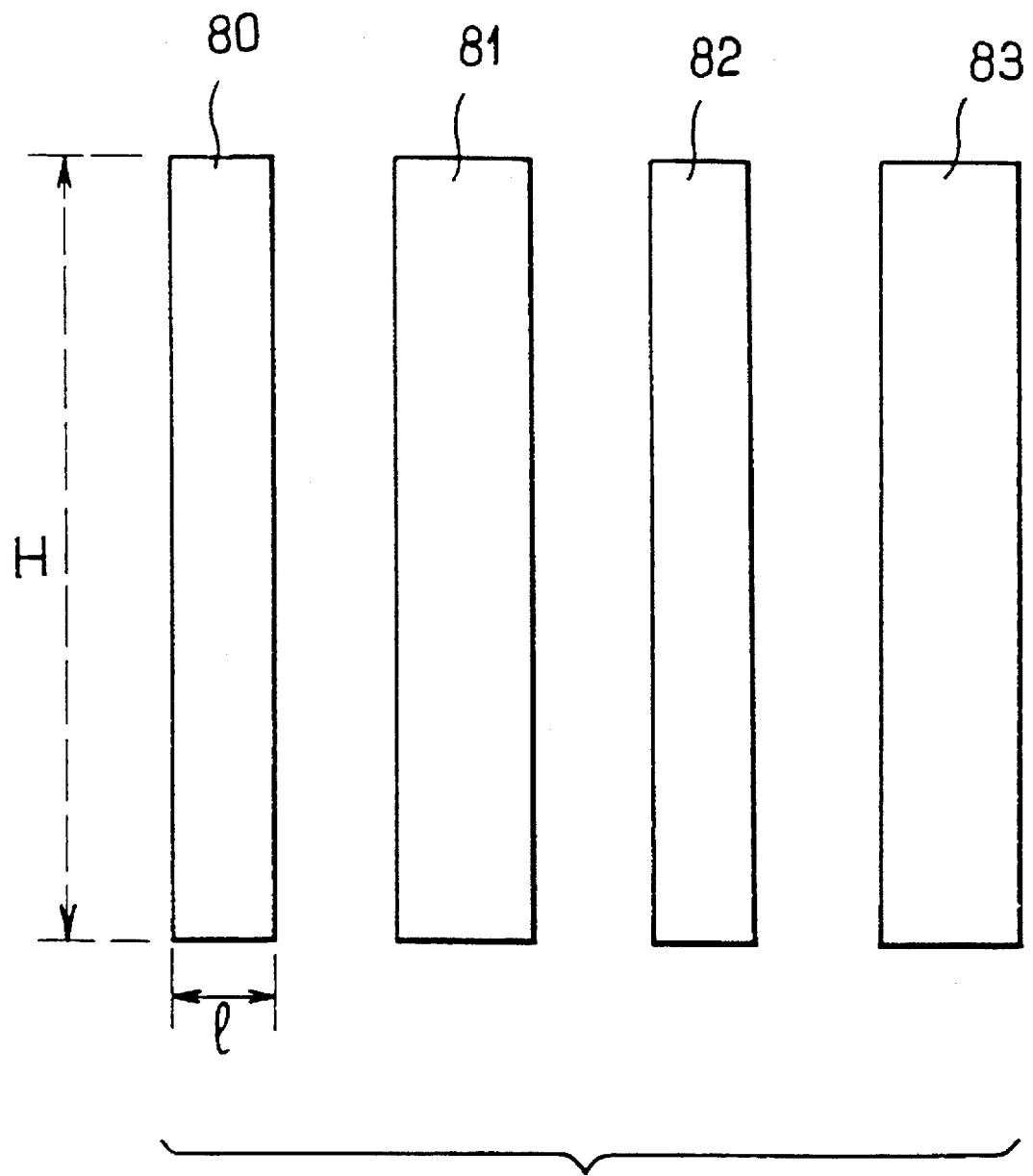
FIG. 8 represents an unwound, initially cylindrical area for logging chart the information logged from each pad.

Referring to FIGS. 1a and 1b, a dipmeter type tool fitted with appropriate means as mentioned previously is lowered into a borehole of nominal diameter φ on a cable that is not shown but which incorporates all the necessary electrical and mechanical connections. Only the lower part of this tool is shown in figure 1b. The tool 2 includes at least four pads 3 through 6 which are coupled in pairs to constitute two calipers 3, 5 and 4, 6 disposed in perpendicular directions. One caliper, for example the caliper 3, 5, measures the greatest horizontal deformation of the borehole $\phi_1$. The other caliper 4, 6 measures the deformation $\phi_2$ of the borehole perpendicular to the deformation $\phi_1$.

Using magnetometers which are part of the tool, the deviation or dip of the axis 8 of the borehole from the vertical is determined. The azimuth $a_1$ of the axis 8 of the borehole is also measured in a geographical system of axes, together with the azimuth $a_2$ of the pad 3 which is taken as the reference pad, the azimuths $a_1$ and $a_2$ being expressed relative to magnetic North, for example, and measured clockwise.

The eccentricity $e_m$ of the borehole is determined continuously as the tool 2 is raised from a given low point in the borehole to a given high point in the borehole. The eccentricity $e_m$ is determined by the ratio $\phi_2/\phi_1$ where $\phi_1$ is the largest diameter measured and $\phi_2$ is the smallest diameter measured. The eccentricity error $\Delta e_m$ is calculated from the equation $$1 - \frac{\phi_2}{\phi_1} = 1 - e_m$$

If the ratio $\phi_2/\phi_1$ is equal to 1, the borehole can be assumed to be circular ($\Delta e_m=0$). If the ratio $\phi_2/\phi_1$ is less than 1 ($\Delta e_m>0$), the cross-section of the borehole is oval in shape, like an ellipse. In practise the eccentricity $e_m$ is between 1 and 0.25, the latter value representing a very high degree of ovalization. The threshold for the eccentricity error $\Delta e_s$ is chosen arbitrarily, for example so that $1-\phi_2/\phi_1=0.04$; in this case, the eccentricity error threshold $\Delta e_s$ is set at 4%, the eccentricity error $\Delta e_m$ determined being compared with this threshold value $\Delta e_s$.

The azimuth $a_3$ of one of the pads, for example the pad 4 of the second caliper 4, 6, is determined from the azimuth $a_2$ of the reference pad and the variation $\Delta a_2$ of the azimuth $a_2$ of the reference pad 3 is determined continuously as the tool 2 is moved in the borehole 1 in order to determine the rotation speed $V_R$ of said pad 3 or (which amounts to the same thing) that of the caliper 3, 5.

At another stage the eccentricity error $\Delta e_m$ determined is compared to a predetermined threshold value $\Delta e_s$ to eliminate the effects of irregularities of the wall and, most importantly, of the accuracy of the measurements effected by the calipers 3, 5 and 4, 6. This makes it possible to determine whether the wall of the borehole is subject of ovalization or deformation.

The type of ovalization present in the borehole is determined by comparing the rotation speed $V_R$ with a predetermined threshold value $V_S$.

The error $\Delta_a$ between the azimuth $a_1$ of the borehole and the azimuth $a_2$ or $a_3$ (the azimuth $a_2$ in the example shown) of the larger caliper is compared, if necessary, with a predetermined minimum error value $\Delta_a$ min. The error $\Delta_a$ min is chosen according to the value of the dip of the borehole. Thus the farther the dip of the borehole departs from the vertical, the greater the action of the string of drill pipes and the greater the error $\Delta_a$ min. For example, when the dip is:

i) greater than 10°, $\Delta_a$ min is equal to 30°, ii) between 5° and 10°, $\Delta_a$ min is equal to 20°, iii) less than 5°, $\Delta_a$ min is equal to 10°.

If the value of the rotation speed $V_R$ is greater than the predetermined threshold value $V_S$ ovalization of the helical void type is present.

If the value of the rotation speed $V_R$ is less than the predetermined threshold value $V_S$, then the error $\Delta_a$ is compared with $\Delta_a$ min. If $\Delta_a$ is greater than $\Delta_a$ min, the ovalization is of the scaling type. If $\Delta_a$ is less than $\Delta_a$ min, the ovalization is of the wear type.

FIG. 2, lines 3a through 6a shows, in an unwound, initially cylindrical chart of the information logged from the four pads 3 through 6, respectively. The dark areas 20 represent areas of high conductivity. The lighter areas 21 represent low values of conductivity, i.e. high values of resistivity. The area 22 in which the direction of the trace changes corresponds to an area of the borehole in which the measuring tool jammed momentarily, this corresponding to a borehole diameter equal to the nominal diameter φ for the area in question; this can also be seen in FIGS. 3, 7a and 7b in which at depth 3504 of the borehole the two measured diameters are equal (see 32 in FIG. 3) because of the virtual superimposition of the two curves 30 and 31; in FIG. 4 the eccentricity 41 is very much lower than the predetermined threshold; in FIGS. 7a and 7b there is a constriction 70.

When the tool is guided there is no change of direction in the traces and each change of direction indicates that the tool is no longer guided and can turn, without resistance, as it is drawn upward by the cable.

At depth 3515 both traces 3a and 5a are light in colour (high resistivity) whereas the traces 4a and 6a are dark, showing high conductivity.

The width of the traces 4a and 6a is much less than that of the traces 5a and 3a which indicates that at this location the borehole is subject to ovalization and that the pads 4 and 6 are on the major axis of the oval. On the major axis of the oval the wall is subject to scaling, and mud permeating into the area subject to scaling makes the formation more conductive than the same formation seen at the same depth by the pads 3 and 5.

This can be seen in FIG. 3 in which the curve 31 representing the diameter measured by the pads 3 and 5 is close to the nominal diameter 33 whereas the curve 30 representing the diameter measured by the pads 4 and 6 is very far away from the nominal diameter. This corresponds to a high eccentricity error 42 in FIG. 4, very much greater than the predetermined threshold 41.

Examination of FIGS. 3 and 4 shows that there is a perfect correspondence between the curves shown. The part 42 of FIG. 4 which represents a high eccentricity, of almost 0.5, corresponds to a very clear separation of the curves 30 and 31 in FIG. 3. The same phenomenon, although less accentuated, is seen in part 43 of FIG. 4, the curves 30 and 31 from FIG. 3 being still far apart. On the other hand, the point of contact of the part 32 of the curves 30 and 31 which are coincident in the figure with the vertical 33 (nominal borehole diameter) shows clearly that there is no eccentricity and no voids whereas the respective parts 35 and 36 of curves 30 and 31 (depths 3500 to 3503) shows that the eccentricity is very slight (the curves 30 and 31 being very close together), but that there is a void since the diameter of the borehole is not the nominal diameter 33.

Between depths 3537 and 3541, the curves 30 and 31 are also very close together although in this case they are very far away from the nominal borehole diameter 33, which indicates that there is no or little eccentricity but also indicates the presence of a void.

The corresponding aligned parts in FIG. 4 confirm the greater or lesser eccentricity at the various depths in the borehole.

In FIG. 5 the line 50 represents an imaginary vertical axis. The curve 51 shows the deviation of the borehole axis relative to the imaginary vertical axis 50. Between depths 3507 and 3522 there is virtually no deviation. At other depths in the borehole on either side of those indicated and visible in the figure, the deviation is less than 5°.

The dashed curve 52 represents the direction of the deviation 51 relative to North, in the form of an angle between 0° and 180°. For the part of the borehole between depths 3507 and 3522, the curve 52 includes a part 53 subject to high levels of fluctuation because the measured azimuth in a sub-horizontal plane does not make sense mathematically or physically. The parts 54 and 55 of the curve 52 indicate that the direction of the deviation varies very little.

The dotted curve 56 shows the direction of the major axis of the oval relative to North, in the form of an angle between 0° and 180°.

Up to depth 3505, the part 59 of the curve 56 corresponding to an area of the borehole indicates that the major diameter of the oval is measured alternately by the calipers 3, 5 and 4, 6. The same phenomenon occurs between depths 3537 and 3541. Consequently, between depths 3505 and 3537, on the one hand, and beyond depth 3541, on the other hand, the curve 56 comprises two parts 57 and 58 which indicate a slight variation in the direction of ovalization, and the conclusion to be drawn from this is that the tool is turning very slightly in the borehole, the tool turning even less in the part 58 than in the area 57. However, the rotation speed of the tool is higher in the lower end part of the area 58 than in the area 57.

The thick dotted line curve in areas 57 and 58 represents ovalization exceeding the predetermined threshold. The area 57 corresponds to the parts 42 and 43 of FIG. 4. Examining the parts of FIGS. 2, 3, 4 and 5 corresponding to the parts 42 and 43 of FIG. 4 confirms the presence of pure scaling.

The thick dotted curve in FIG. 5 corresponding to parts 42 and 43 of FIG. 4 indicates a low speed of rotation of the tool, a low variation in the speed of rotation of the tool and virtually no deviation of the borehole. Parts 42 and 43 of FIG. 4 indicate a very high eccentricity indicating a high amplitude of ovalization. Taken together, all this information makes it virtually certain that scaling is present.

The irregularity of the curves 30 and 31 corresponding to the areas 42 and 43 support the presence of ovalization by scaling.

With reference to these same parts 42 and 43, FIG. 2 can be used to determine if scaling is present or not. In line with the parts 42 and 43, the image logs for the pads 3 through 6 in the borehole differentiate conductivity differences between the pads. Consider portions 23 and 24 of traces 4a and 6a, for example: notice that they are dark between depths 3504 and 3530, which shows high conductivity, whereas for the same depths the portions 25 and 26 of traces 3a and 5a show lighter areas, indicating low conductivity or high resistivity. The conclusion to be drawn from this is that there are cracks in the wall of the borehole which have been permeated by the conductive mud used as a drilling lubricant. Because the deformation of the borehole is due to ovalization by cracking, it can be deduced that the ovalization of the wall of the borehole was caused by wall portions between cracks falling into the borehole, these portions being known as "scales".

FIG. 6 represents a synthesis of the information given by FIGS. 2 through 5.

The area 60 is an area with no marked ovalization (part 59 of curve 56), with an eccentricity error below the threshold (part 41 of FIG. 4), and including at least one void (parts 35 and 36 of curves 30 and 31) which indicates low cohesion of the materials constituting the rock present at this depth.

Area 61 is an area of the borehole in which there is no deformation, the aligned curves 30 and 31 being practically coincident and the measured borehole diameter being substantially equal to the nominal diameter.

Areas 62 and 63 are areas of marked ovalization, with very high eccentricity (FIG. 4), a low rotation speed of the tool (FIG. 5), virtually no deviation of the borehole axis (FIG. 5) and undoubted scaling given the high conductivity in the direction of the major axis of the ellipse (FIG. 2), this direction being shown by a straight line segment 62a in the case of area 62 at 75° relative to North (i.e. East-North East) and in the case of area 63 by a straight line segment 63a at 110° relative to North (i.e. East-South East).

Area 64 is an area in which the eccentricity error is, overall, greater than the threshold (part 57 of curve 56), but relatively small, with a small deviation of the borehole. Despite this small deviation of the borehole, there is some parallelism between the curve 56 and the curve 52. The error $\Delta_a$ between these two curves is measured and then compared to a predetermined error $\Delta_a$ min. Since $\Delta_a$ is greater than but close to $\Delta_a$ min, it can be deduced that scaling is probable. If the error $\Delta_a$ is less than $\Delta_a$ min, then wear type ovalization is present. The straight line segment 64a represents the direction of the mean major axis of ovalization in this area, this segment being at 140° relative to North (i.e. South-East).

The area 65 is an area in which the diameters measured by the calipers are substantially equal (curves 30 and 31 are practically superimposed), with a slight deviation in the direction of the borehole and a global eccentricity below the threshold. Also, in the area in question, the curves 52 and 56 are substantially parallel and the error $\Delta_a$ between them is less than $\Delta_a$ min. The rotation speed $V_R$ of the tool is determined, for example calculated, and then $V_R$ is compared to a predetermined fixed value $V_S$. In this area, $V_R < V_S$ and because $\Delta_a$ is less than $\Delta_a$ min, the conclusion is that ovalization by wear is present.

Areas 66 and 67 are analogous to areas 62 and 63, i.e. to areas of ovalization by scaling, with no conductivity anomalies visible in FIG. 2 and with ovalization major axis directions indicated by the respective straight line segments 66a and 67a; the segment 66a is at 30° North (North-East) and the segment 67a is at 35° North (North-East).

The area 68 is an area in which the eccentricity error is greater than the threshold, the tool rotation speed $V_R$ is high and greater than the threshold $V_S$ (change in direction of the curve 52) and $\Delta_a > \Delta_a$ min. The conclusion to be drawn from this is the presence of helical void type ovalization caused by rotation friction of the drill pipe string in an area of low cohesion or in which the axis of the borehole is changing direction.

The curve used to generate the ovalization direction curve 56 is smoothed so as not to intersect the borehole at too many non-meaningful areas of the lithology encountered.

FIGS. 7a and 7b show the diameters of the borehole as in two perpendicular directions as a function of the depth.

Traces 70a through 71b show the walls of the borehole in the chosen section plane passing through the axis of the borehole, the distances between these walls in a plane perpendicular to the section plane representing the apparent diameters of the borehole.

Traces 72 (FIG. 7a) and 73 (FIG. 7b) respectively correspond to pads 3 and 5, the traces corresponding to pads 4 and 6 not being shown in FIGS. 7a and 7b. FIGS. 7a and 7b show the eccentricity in all directions through an appropriate choice of the section plane.

In accordance with another feature of the invention, the logged information from the calipers 4, 6 and 3, 5 is viewed on any medium, such as a screen or a strip paper chart, in the form of an image log (see FIG. 8) comprising separate rectangular strips 80 through 83 of varying widths; each strip is the image of one pad of the calipers on the unwound cylinder of diameter $\phi$, said strip having a horizontal dimension or width l and a vertical dimension H representing the recordings at various depths.

FIG. 1a is a diagrammatic plan view of a circle representing the borehole of nominal diameter $\phi$ and an ellipse 9 representing the ovalized deformation of the borehole, together with the four pads 3 through 6.

Assuming a cylindrical initial volume, the information obtained from each pad 3 through 6 would be shown on the image log by strips of identical width, equal to:

$L_1$=pad width×display scale.

The width of the image log would be equal to:

L=$\pi \times \phi \times$display scale.

The representation on an image log of the information logged by each pad in any non-cylindrical volume depends on the ratio between the nominal diameter $\phi$ of the image log and the diameter $\phi_e$ logged by the pair of pads including the pad in question.

The width $L_1$ of the image of a pad at a distance $\phi_e/2$ from the axis of the borehole or from the tool is equivalent on the image log of radius $\phi/2$ to l=$L_1 \cdot \phi/\phi_e$.

The strip width on the image log of diameter $\phi$ corresponding to a pad at a distance $\phi_1/2 > \phi/2$ is less than the width of the pad (to the nearest display increment); likewise, the width of the strip corresponding to a pad at a distance $\phi_1/2 < \phi/2$ is greater than the width of the pad.

The representation method is valid regardless of the number of pads and their width and whether the pads are linked in pairs or independent of each other. The relative position of the pads on an image log is obtained by a measurement specifying the position of one of the pads, the reference pad for example, in the system of axes of the borehole, the position of the other pads being calculated from the angular offset between the pads.

The method of the invention can display the various measurements on a medium as a function of depth to produce borehole logs, the different types of ovalization, depending on depth, being shown using a representation code, for example in the form of coloured areas in which each colour corresponds to a given type of ovalization (areas 60 through 68 of FIG. 6, for example).

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. Method of determining variations in the morphology of a borehole, using a tool comprising at least first and second calipers, each of the calipers having a measurement unit, said method comprising: measuring by means of said tool and as a function of depth the dip and the azimuth ($a_1$) of the borehole in a geographical system of axes;

the inside diameters of the borehole in two directions, by means of the first and second calipers; and, the azimuth ($a_2$) of the first caliper determining the eccentricity ($e_m$) of the borehole, at a given depth, said eccentricity ($e_m$) being representative of the ratio of the measured inside diameters of the borehole and of the eccentricity error $\Delta e_m = 1 - e_m$, determining the azimuth ($a_3$) of the second caliper from the azimuth ($a_2$) of the first caliper in the system of axes of the borehole, determining the variation in the azimuth ($a_2$) of the first caliper during displacement of the tool in the borehole in order to determine the rotation speed ($V_R$) of said first caliper during said displacement, comparing said eccentricity error ($\Delta e_m$) to a threshold value ($\Delta e_s$) to define the presence of ovalization of the borehole when ($\Delta e_m$) is greater than ($\Delta e_s$) and then determining the type of ovalization by comparing the rotation speed ($V_R$) to a threshold value ($V_s$).

2. Method according to claim 1 wherein if the rotation speed ($V_R$) is less than the threshold value ($V_s$) said method further comprises measuring the azimuth error ($\Delta_a$) between the azimuth ($a_1$) of the borehole and the larger of the azimuth ($a_2$ or $a_3$) of the first and second calipers, and then comparing said azimuth error ($\Delta_a$) with a predetermined error value ($\Delta_a$ min).

3. Method according to claim 2 wherein the type of ovalization determined is scaling type ovalization if the error ($\Delta_a$) is greater than the error value ($\Delta_a$ min).

4. Method according to claim 2 wherein, the type of ovalization determined is wear type ovalization if the error ($\Delta_a$) is less than the error value ($\Delta_a$ min).

5. Method according to claim 1 wherein the type of ovalization determined is helical void type ovalization if the rotation speed ($V_R$) is greater than the threshold value ($V_s$).

6. Method according to claim 1 wherein the curve representing variation in the azimuth ($a_2$) of the first caliper during displacement of the tool in the borehole is smoothed prior to determining the type of ovalization.

7. Method according to any one of claims 1 to 6, wherein the dip and the azimuth ($a_1$) of the borehole, the inside diameters of the borehole and the azimuth ($a_2$), are viewed on a medium in the form of an image log, the image log comprises separate strips of varying width, each strip displaying at least one of the measurements.

8. Method according to claim 7 wherein the measurements are viewed on a medium as a function of depth, thereby producing borehole logs.

9. Method according to claim 7 wherein the type of ovalization is also viewed on a medium, on a separate strip, as a function of the depth, using a representation code to represent the type of ovalization.

10. Method according to any one of claims 1 to 6 wherein the dip and the azimuth ($a_1$) of the borehole, the inside diameters of the borehole and the azimuth ($a_2$), are viewed on a medium as a function of depth thereby producing borehole logs.

11. Method according to any one of claims 1 to 6 wherein the types of ovalization are viewed on a medium as a function of the depth using a representation code.

12. Method according to claim 11, wherein the representation code is a color code having each of a plurality of colors correspond to a type of ovalization.

13. Method according to claim 7, wherein each of the calipers comprises a pair of caliper pads, and at least one strip displays the image of the measurements of at least one of the pair of caliper pads, and the width of the at least one strip is proportional to the width of the corresponding caliper pad and to the ratio of the nominal diameter of the borehole to the diameter measured by the caliper of which said caliper pad is part.

* * * * *